(12) United States Patent
Moser et al.

(10) Patent No.: US 8,882,309 B2
(45) Date of Patent: Nov. 11, 2014

(54) DEVICE FOR FASTENING AND CONTACTING A LIGHTING MEANS, A LIGHTING MODULE, OR LAMP

(75) Inventors: Peter Moser, Stans (AT); Thomas Riedler, Baumkirchen (AT)

(73) Assignee: Tridonic GmbH & Co KG, Dornbirn (AT)

( * ) Notice: Subject to any disclaimer, the term of this patent is extended or adjusted under 35 U.S.C. 154(b) by 0 days.

(21) Appl. No.: 14/009,940

(22) PCT Filed: Apr. 3, 2012

(86) PCT No.: PCT/AT2012/000088
§ 371 (c)(1),
(2), (4) Date: Dec. 16, 2013

(87) PCT Pub. No.: WO2012/135878
PCT Pub. Date: Oct. 11, 2012

(65) Prior Publication Data
US 2014/0092607 A1    Apr. 3, 2014

(30) Foreign Application Priority Data
Apr. 8, 2011    (AT) ...................................... 205/2011

(51) Int. Cl.
*B60Q 1/00* (2006.01)
*F21V 19/00* (2006.01)
*F21Y 101/02* (2006.01)

(52) U.S. Cl.
CPC ............. *F21V 19/00* (2013.01); *F21V 19/0005* (2013.01); *F21Y 2101/02* (2013.01); *Y02B 10/20* (2013.01)
USPC ......................................................... 362/368

(58) Field of Classification Search
CPC .................................. F21V 19/0005
USPC ......................................................... 362/368
See application file for complete search history.

(56) References Cited

U.S. PATENT DOCUMENTS

| 7,097,508 | B1 | 8/2006 | Yang | |
|---|---|---|---|---|
| 2009/0160302 | A1* | 6/2009 | Imai et al. | 313/1 |
| 2011/0260182 | A1* | 10/2011 | Hussell | 257/91 |

FOREIGN PATENT DOCUMENTS

| DE | 202006018190 U1 | 2/2007 |
|---|---|---|
| DE | 202009012000 U1 | 12/2010 |
| JP | 2007005193 A | 1/2007 |
| JP | 2009199844 A | 9/2009 |
| WO | 2010/131961 A1 | 11/2010 |
| WO | 2011019945 A1 | 2/2011 |

OTHER PUBLICATIONS

English translation of DE 20 2009 012000 (Feb. 3, 2011).*

* cited by examiner

*Primary Examiner* — Anh Mai
*Assistant Examiner* — Hana Featherly
(74) *Attorney, Agent, or Firm* — Volpe and Koenig, P.C.

(57) ABSTRACT

A device is provided for fastening and contacting a lighting means and/or a lighting module, the device including at least one socket housing. The lighting means and/or lighting module is arranged in the socket housing of the device. The lighting means and/or lighting module has at least two contacting elements, which are arranged separately from each other on the lighting means and/or lighting module and which are each electrically contacted by means of a respective individual contact of the socket housing. The device includes an adapter element having at least one collective contact point, having at least one electrical connection. An individual contact of the socket housing and a contact of a collective contact point are connected by means of an electrical connection. Also provided is a lamp having such a device.

10 Claims, 8 Drawing Sheets

DEVICE FOR FASTENING AND CONTACTING A LIGHTING MEANS, A LIGHTING MODULE, OR LAMP

FIELD OF THE INVENTION

The invention relates to a device for fastening and contacting a lighting means and/or a lighting module, in particular an LED module and to a lamp, in particular in the form of a downlight, having such a device.

BACKGROUND

Such devices are used for fastening at least one lighting means and/or lighting module, in particular LED module, and contacting to a voltage supply. Said devices are also connected to a lamp.

Devices for LED modules, also referred to as LED light engine, are known from the prior art, which make it possible for the LED module rear side to be pressed onto a heat sink area. This is intended to be performed using a defined force in order to be able to ensure necessary heat dissipation. As a result, the life of the LEDs is influenced. The device has, for example, a lampholder housing with at least one outer ring and one inner ring, which is mounted in the outer ring with a plurality of separate compression springs, screws and washers distributed about the perimeter. Owing to the resilient mounting of the inner ring, the rear side of the LED module is pressed onto a heat sink. The inner ring is intended to be produced from a polymer which is resistant to high temperatures owing to the generation of heat of the LED module.

Furthermore, it is known from the prior art, inter alia also from DE 20 2009 012 000 U1, that the LED module is provided with a plurality of contacting elements and is electrically contacted to individual contacts in the lampholder housing of the device. A further conductor connection is provided from the individual contacts. One disadvantage is that a plurality of conductors are provided from the lampholder housing without being guided in orderly fashion. This is not recommended for electrical reasons owing to a risk of polarity reversal, but also for visual reasons.

SUMMARY

An object of the invention is in configuring and developing a device for fastening and contacting a lighting means and/or lighting module, in particular an LED module, in such a way that the mentioned disadvantages are eliminated, wherein simple and accessible fitting of the connecting conductors can be ensured. In addition, the intention is to avoid an erroneous connection.

This object is achieved according to the invention by the features specified in the independent claims.

The device for mechanically fastening and electrically contacting a lighting means and/or a lighting module, in particular an LED module, has at least one lampholder housing, and the lighting means and/or lighting module, in particular LED module, is arranged in the lampholder housing of the device, wherein the lighting means and/or lighting module, in particular LED module, has at least two contacting elements, which are arranged separately from one another on the lighting means and/or lighting module, in particular LED module, and which can each be electrically connected to an individual contact of the lampholder housing.

An essential feature of the device is that the device has an adapter element with at least one group contact point, wherein an at least electrical connection is provided, wherein an individual contact of the lampholder housing and a contact of a group contact point can be connected to an electrical connection.

At least two contacting elements are provided on the lighting means and/or lighting module, in particular LED module. Generally, three or five contacting elements (two contacting elements for the phase conductor and the neutral conductor, one contacting element for the PE conductor and possibly two contacting elements for an interface for further monitoring or control elements) can be provided, which are distributed in the circumference of the lighting means and/or lighting module, in particular LED module. As a result, the individual contacts are distributed on the lampholder housing also in the circumference of the lampholder housing, as well as the associated contact terminals for a further conductor connection. In order for it not to be necessary to connect all of these poles individually at the circumference, but for it to be possible for all poles to be connected at one point, the adapter element according to the invention is advantageous.

Owing to the distribution of the contacting elements on the lighting means and/or lighting module, in particular LED module, disadvantages arise which can be eliminated by the invention.

The fitting or the wiring of the unit, device with LED module and heat sink, is particularly simplified and is thus also more easily accessible since the fitter or person skilled in the art now only needs to connect the various conductors at one point over the circumference of the device.

In addition, errors or confusion during electrical connection of the lighting means and/or lighting module, in particular LED module, can also be avoided.

The disadvantage that many conductors lie around the device, the heat sink or the LED module is eliminated by virtue of the fact that the conductors only protrude out of the group contact point and can be guided better for further wiring.

The group contact point can also be referred to as a node point.

It is preferable that each contact of the group contact point which is connected to an individual contact of the lampholder housing via an electrical connection is connected to a single individual contact of the lampholder housing via a single electrical connection.

Provision can be made for some individual contacts of the lampholder housing not to have an associated electrical connection for the group contact point. This may arise primarily for grounding since it does not require long wiring from the contact terminal if contact is made directly at the heat sink.

The group contact point should enable grouping of the connections, wherein the respective contacts can be arranged next to one another and/or one above the other.

The invention also provides that a first proportion of the individual contacts of the lampholder housing, that is one or more individual contacts, are passed via first electrical connections to a first group contact point of the adapter element, and a further proportion of the individual contacts of the lampholder housing, again one or more individual contacts, are passed via further electrical connections to a further group contact point of the adapter element.

For fitting or accessibility or, for example, coding reasons, it may be advantageous that a plurality of group contact points are provided on the adapter element. One or more individual contacts can in this case be connected or contacted to a first group contact point via their respective electrical connections, one or more further individual contacts can be connected or contacted to a second group contact point via their respective electrical connections, etc.

For example, a first group contact point can be provided for the individual contacts which are intended to be contacted to a phase and/or neutral conductor. A further or second group contact point can be contacted, for example, to the individual contacts which are intended to be connected to control and/or monitoring elements. Examples of control and/or monitoring elements which can be provided are emergency lighting or dimming units. Further group contact points are also conceivable, if required. In this way, the connections can be grouped, which improves electrical fitting, although they are arranged completely separately on the lighting means and/or lighting module, in particular LED module.

It is also essential that the respective electrical connections can be arranged in the adapter element. For example, they can be arranged in guide tracks of the adapter element. As a result, no spare lines protrude out of the device.

For example, the electrical connections can be in the form of stamped parts or in the form of wire inserts. They can also be formed from conductor track circuit boards, for example. Other possibilities cannot be ruled out, however, but they are not listed and described in detail here.

In accordance with the invention, a further conductor connection can be performed indirectly or directly from at least one group contact point of the adapter element.

An electrical terminal can be fitted at at least one group contact point of the adapter element. This may be an electrical terminal known per se. As a result, the further conductor connection to an electrical terminal is simplified.

Furthermore, the adapter element can be connected to the lampholder housing. Preferably, a plug-type connection is used between the adapter element and the lampholder housing. Preferably, the adapter element is located between the lampholder housing and the heat sink in the fitted state. Since the lampholder housing is fastened to the heat sink, for example using fastening screws, the adapter element is also fastened at the same time.

It is also preferable to provide polarity reversal protection for fitting the adaptor element on the lampholder housing. The intention is thus to prevent the possibility of electrical contacts being mixed up.

The shape or geometry of the adapter element can be adapted to the shape or geometry of the lampholder housing. If the lampholder housing is in the form of a ring, the adapter element can be formed as a ring with approximating outer and inner diameters.

It may also be conceivable for the adapter element to be integrated in the lampholder housing. As a result, the number of parts of the apparatus is reduced, which is advantageous from the point of view of cost. The fitting of the device is thus also simplified.

The electrical connections can also be formed integrally with the individual contacts. The guide tracks for the electrical connections can be provided in the lampholder housing. The group contact point which in this case can also be provided on the lampholder housing can have a plurality of contact terminals, which can be arranged next to one another and/or one above the other at the group contact point, or can have an electrical terminal known per se.

It is advantageous if both contacting of the electrical connection and additional contacting via the contact terminal can take place from an individual contact of the lampholder housing. The arrangement of the contact lugs for contacting the electrical connection does not prevent additional contacting, known per se, via the contact terminal on the lampholder housing.

Further embodiments of the device with the adapter element are not described here, but should not be ruled out of the invention.

A further essential feature of the invention consists in that the device for fastening and contacting a lighting means and/or a lighting module, in particular an LED module, is connected indirectly or directly to a lamp. The lamp provided can be, for example, a downlight lamp.

In addition, the invention relates to a lighting means or lighting module, in particular LED module, and to a lamp having the device according to the invention.

BRIEF DESCRIPTION OF THE DRAWINGS

In the text which follows, the invention is described in more detail using embodiments, but these should only be interpreted by way of example, without restriction.

In the drawings:

FIG. 7b shows a detail view of contacting from FIG. 7a.

FIG. 8b shows a detail view of contacting from FIG. 8a.

FIG. 10b shows a detail view of contacting from FIG. 10a.

FIG. 11b shows a detail view of the grounding shown in FIG. 11a.

DETAILED DESCRIPTION OF THE PREFERRED EMBODIMENTS

Figure 1:
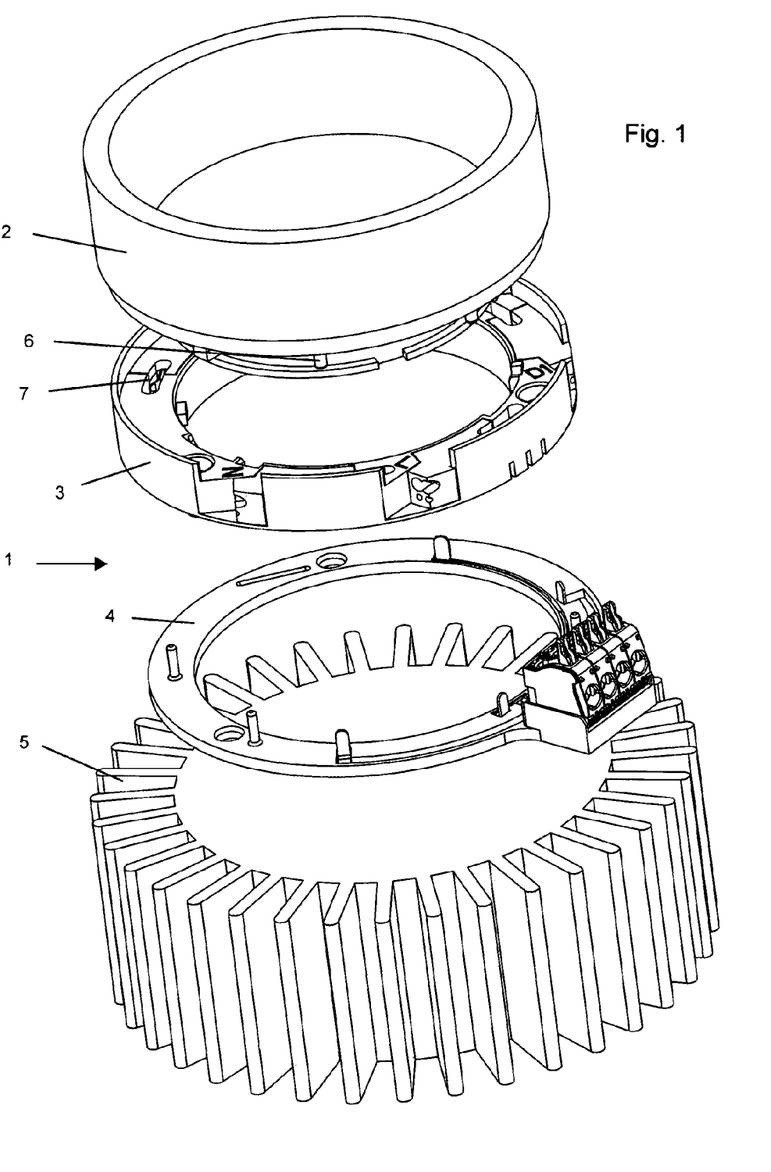
FIG. 1 shows an exploded view of a first device according to the invention having an LED module and a heat sink.

FIG. 1 illustrates a device 1 with a lighting means and/or lighting module, in particular LED module 2, and a heat sink 5. In the further description, the lighting means and/or lighting module, in particular LED module 2, is now only described as LED module 2, whereby other lighting means and/or lighting modules are not intended to be ruled out.

The device 1 with the LED module 2 and the heat sink 5 are generally part of a lamp. In this case, this may be a downlight lamp. Other types of lamp are nevertheless not intended to be ruled out of the invention.

The device has a lampholder housing 3 and an adapter element 4 according to the invention.

The LED module 2 is fitted in the lampholder housing 3, preferably without the use of tools, for example in accordance with the principle of a bayonet closure.

The LED module 2 has electrical contacting elements 6, which are arranged in the circumference of the LED module 2. Owing to the fitting in accordance with the principle of a bayonet closure, the contacting elements 6 are plugged into the slots 7 in the lampholder housing 3. In the examples illustrated, five contacting elements 6 are provided on the LED module 2.

The arrangement of the contacting elements 6 on the LED module 2 in the perpendicular or horizontal direction is not critical to the invention. The slots 7 are arranged in the lampholder housing 3 with a corresponding fit such that electrical contacting with the respective individual contacts 8 in the lampholder housing 3 can be performed. How the further electrical contacting from the respective individual contacts 8 is performed is essential to the invention.

The fastening of the LED module 2 in the lampholder housing 3 in accordance with the principle of a bayonet closure is preferably performed via other means than the contacting elements 6, which are not described in detail here, since they are not the subject matter of this invention.

Figure 2:
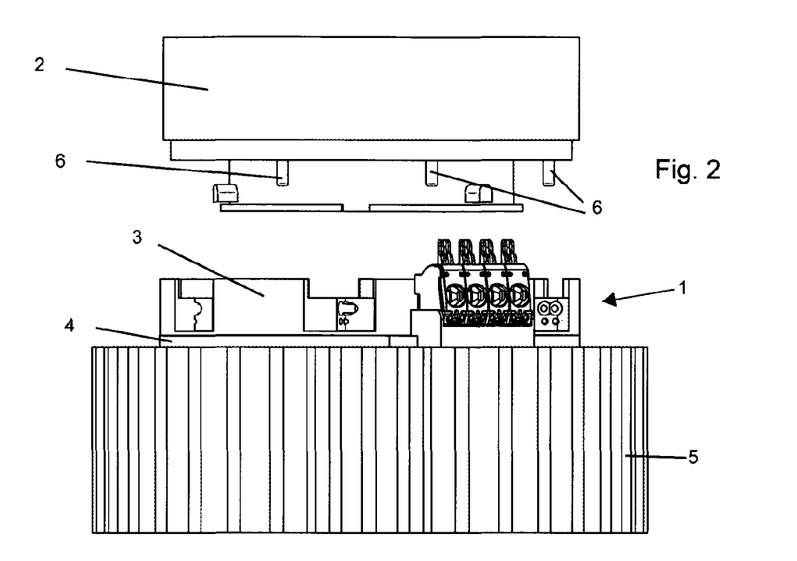
FIG. 2 shows a side view of a device according to the invention, fitted on a heat sink, and with an LED module.
Figure 3:
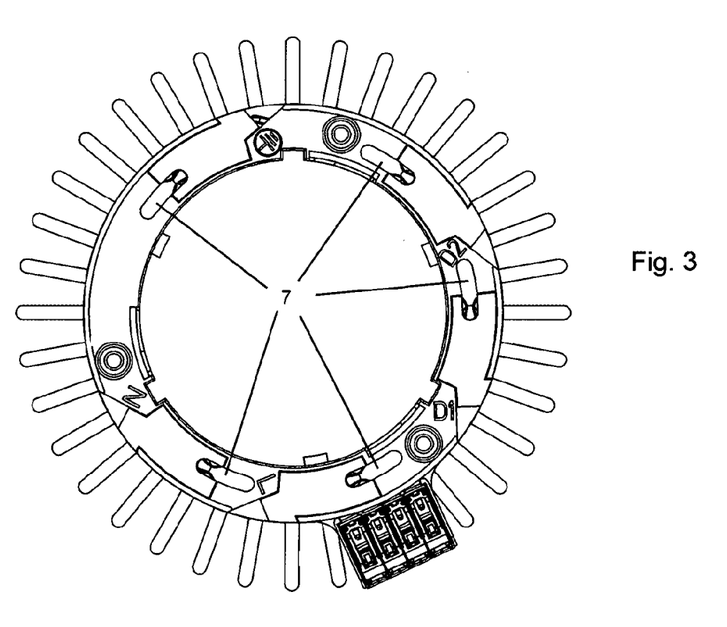
FIG. 3 shows a view from above of a device according to the invention, fitted on a heat sink.

The adapter element 4 is located between the lampholder housing 3 and the heat sink 5. This arrangement can also be seen in FIGS. 2 and 3.

The adapter element 4 can preferably be made of a non-conducting material, for example of plastic.

Figure 4:
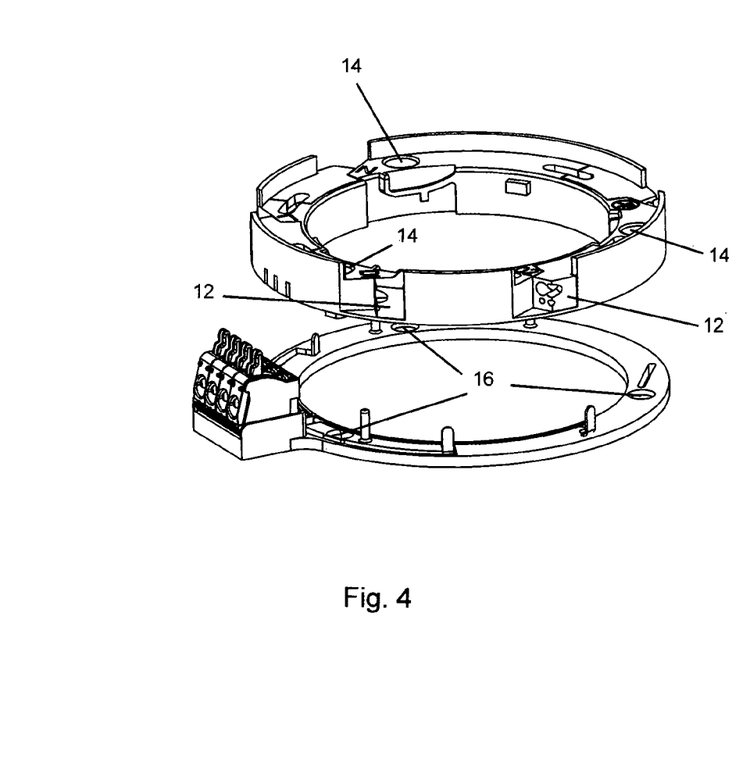
FIG. 4 shows a perspective view of the first device according to the invention with its lampholder housing and its adapter element.
Figure 5:
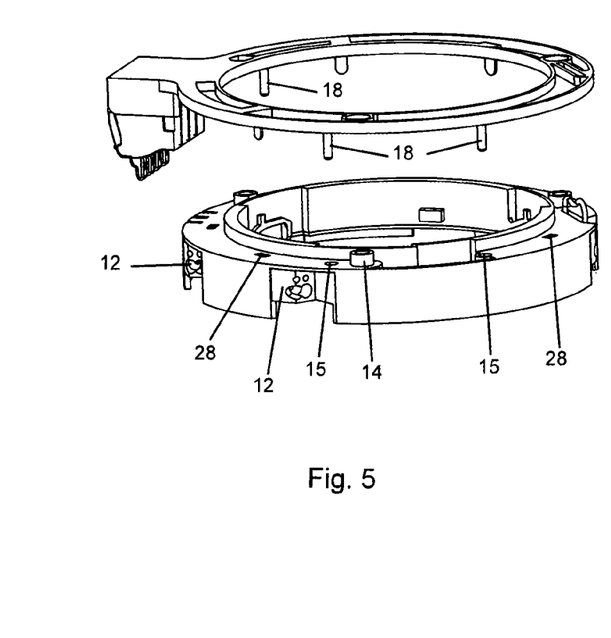
FIG. 5 shows a further perspective view of the first device according to the invention with its lampholder housing and its adapter element.

FIGS. 4 and 5 illustrate a device 1 with its lampholder housing 3 and its adapter element 4.

The adapter element 4 is preferably plugged into the lampholder housing 3. The adapter element 4 can have positioning pins 18, which fit into the positioning holes 15 in the lampholder housing 3 during fitting on the lampholder housing 3. The positioning pins 18 are positioned in the circumference of the adapter element 4 in such a way that a type of polarity reversal protection is provided, in order that the adapter element 4 and the lampholder housing 3 can be connected to one another without any errors.

Since the lampholder housing 3 is connected to the heat sink 5, for example using fastening screws (not illustrated here) in the fastening holes 14 in the lampholder housing 3 and in fastening holes (not illustrated here) of the heat sink 5, the adapter element 4, which is located between the lampholder housing 3 and the heat sink 5, is also fastened via its fastening holes 16.

The contact terminals 12 known per se can nevertheless be provided on the lampholder housing 3. As a result, both connection possibilities are provided and the fitter or person skilled in the art can choose how he would wish to connect the device 1.

Firstly, provision can be made for safety reasons for the adapter element 4 to have covering elements (not illustrated here) for the contact terminals 12 of the lampholder housing 3 in order that, for example, a pole or a contacting element 6 of the LED module 2 is not inadvertently connected twice.

Secondly, it may even be desirable for it to be possible for an additional connection via the contact terminal 12 to be performed, for example when a plurality of LED modules 2 are intended to be connected to one another and one of these modules is connected to the voltage supply via the adaptor element 4. The adaptor element 4 is advantageous here since a plurality of equivalent connection poles can thus be provided in the device 1.

The contact lugs 11 are arranged in such a way that there is no collision of connections between the connecting conductor (not illustrated) from the contact terminal 12 and the lug 21 or the pin 23 of the electrical connection 19 in the adaptor element 4.

FIGS. 6 to 10b show adapter elements 4.

The adaptor element 4 has electrical connections 19, which are intended to pass the individual distributed contacts from the LED module 2 to a node point or a group contact point 25 closer to one another in order that the further conductor connection can be improved and simplified.

Each electrical connection 19 has a contact 26 at the group contact point 25 or is connected to a contact 26. This contact 26 can be connected directly to a further conductor or can be connected to an electrical terminal 27, wherein the further conductor connection (not illustrated here) is then performed via the electrical terminal 27. The contacting between the respective contacts 26 and the further conductor (not illustrated) or the electrical terminal 27 can be performed via one of the conventional or known methods.

A terminal known per se can be used as the electrical terminal 27 for the further electrical connection of conductors (not illustrated here), such as, for example, a solder terminal or a Euro-style terminal strip or screw terminal. With such electrical terminals 27, it is clear and easy to comprehend how the further electrical connection should be performed. There is no longer any risk of confusion and erroneous connections can be avoided since such electrical terminals 27 have pole labels or color identifications.

Figure 6:
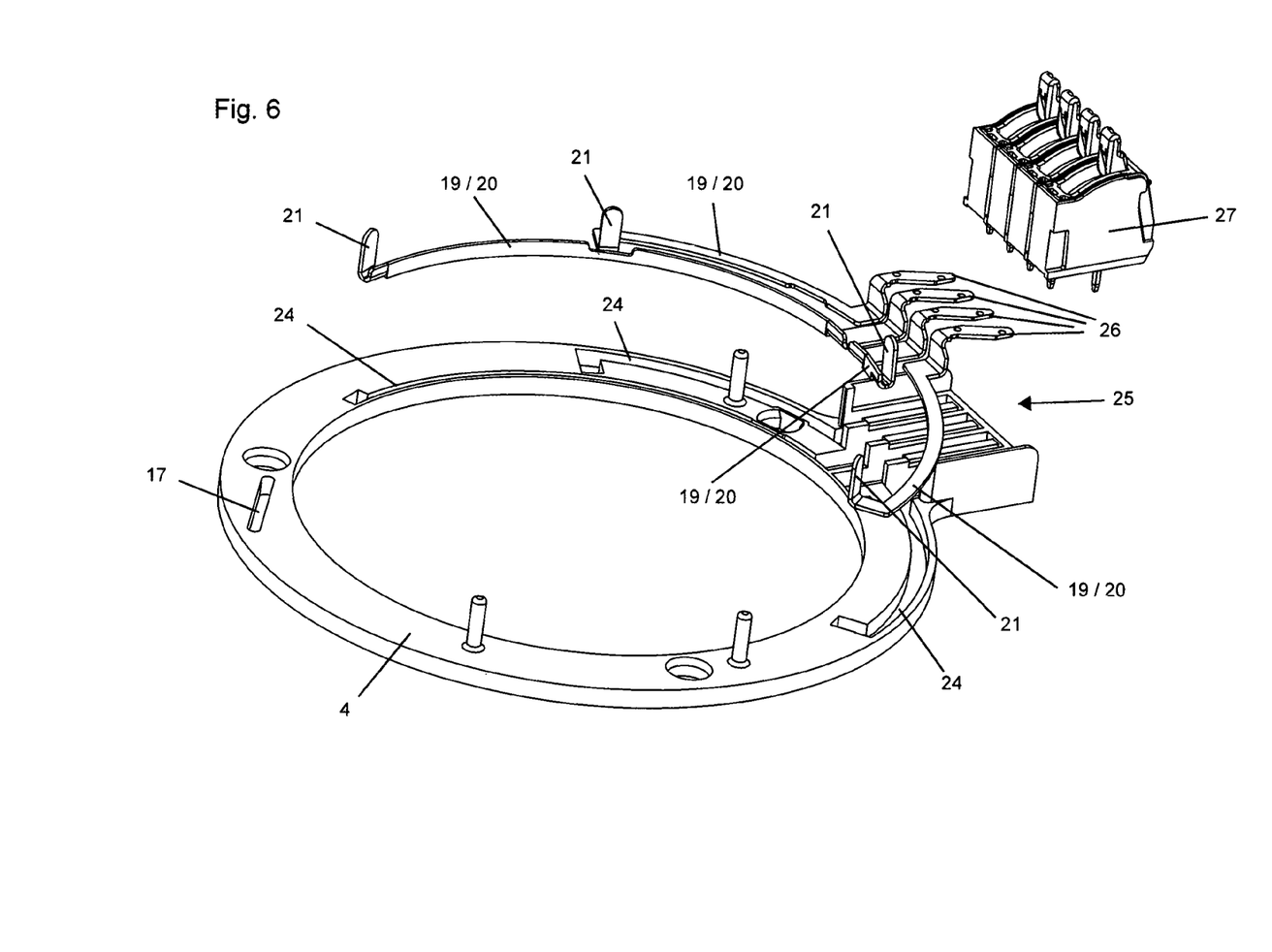
FIG. 6 shows an exploded view of the first adapter element according to the invention.
Figure 7A:
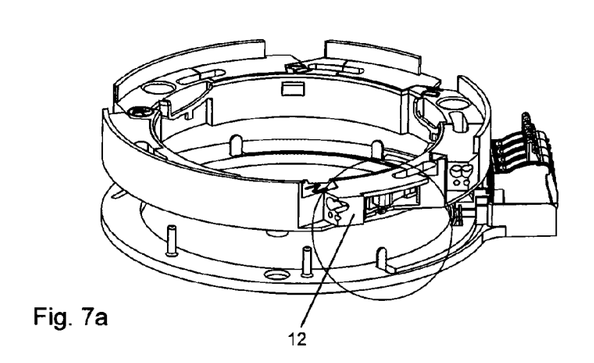
FIG. 7a shows a perspective view of the first device according to the invention with its lampholder housing and its adapter element.
Figure 7B:
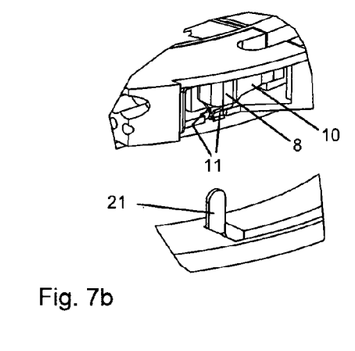
Figure 9:
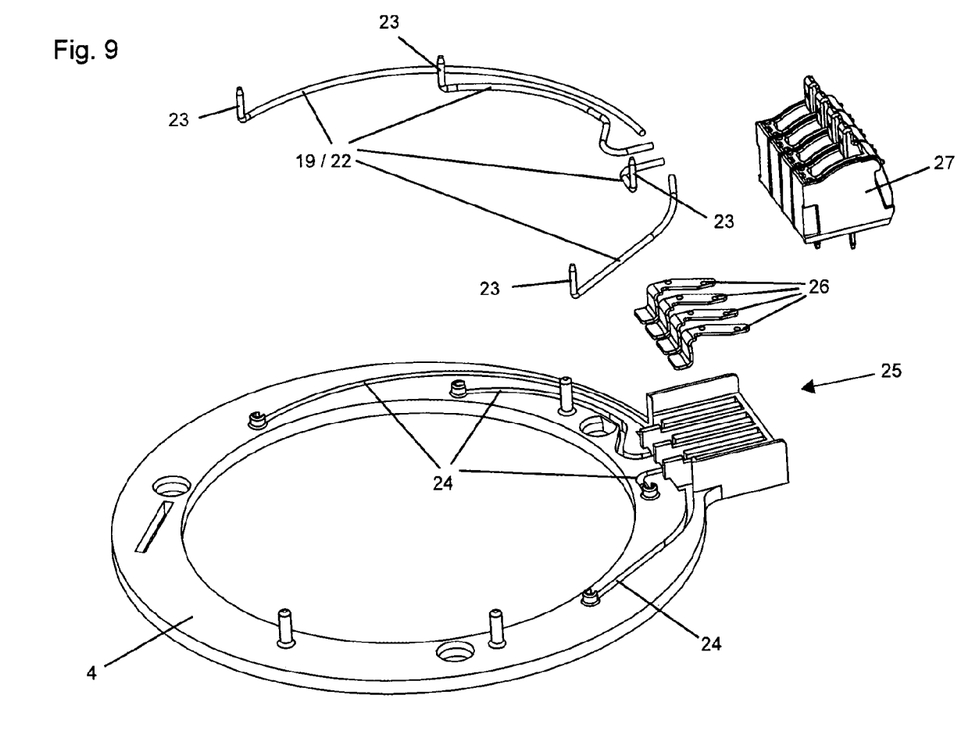
FIG. 9 shows an exploded view of a second adapter element according to the invention.

The group contact point 25 can additionally have a chamber for each contact 26.

The adaptor element 4 can have guide tracks 24, wherein each electrical connection 19 is arranged in a guide track 24. This also results in no electrical contact between the various electrical connections 19. It is also conceivable for the electrical connections 19 to have insulation protection apart from at its contact points or at its ends.

The individual contact 8 in the lampholder housing 3 has, firstly, contact lugs 10 for the electrical contact to a contacting element 6 of the LED module 2, which may be known per se, and, secondly, additional contact lugs 11 for the electrical contact to an electrical connection 19.

The respective contact lugs 10 and 11 can also be referred to as contact forks.

The resilient lug 9 can be used for contacting with an individual contact terminal 12 on the lampholder housing 3 for the further connection of a conductor.

The lampholder housing 3 has cutouts 28, in order that the electrical connections 19 can be contacted with the individual contact 8 in the lampholder housing 3.

In the examples illustrated, four electrical connections 19 are illustrated, although the LED module 2 has five contacting elements 6. Not all of the contacting elements 6 are guided to the group contact point 25, if this is not necessary. One or more contacting elements 6 can be connected further via the contact terminals 12 known per se for various reasons. This is the case here for the grounding 13, for example.

Depending on the installation situation or on the connection scheme, one or more electrical connections 19 can be provided in the adapter element 4.

Depending on the installation situation or on the connection scheme, individual contacts 8 of the lampholder housing 3 can also be further-wired both from the adaptor element 4 and from the contact terminal 12. The selected arrangement of the contact lugs 11 and the resilient lug 9 in the individual contact 8 at the same time enables both connection possibilities.

FIG. 6 to FIG. 8b illustrate a first variant of an electrical connection 19. The electrical connections 19 are in the form of stamped parts 20.

The stamped part 20 is preferably made of copper, but alternatively it can also be made of steel with zinc plating, depending on which electrical properties are desired. One advantage of the stamped part 20 is that this electrical connection is very stable. A lug 21 is bent out of the stamped part 20, and this lug 21 is contacted with the individual contact 8 in the lampholder housing 3.

In this variant, the contacts 26 can even be formed integrally with the electrical connection 19 and 20.

However, owing to the bent shape of the electrical connection with a stamped part 20, there is considerable material wastage, and the manufacturing costs are thus increased.

Figure 10A:
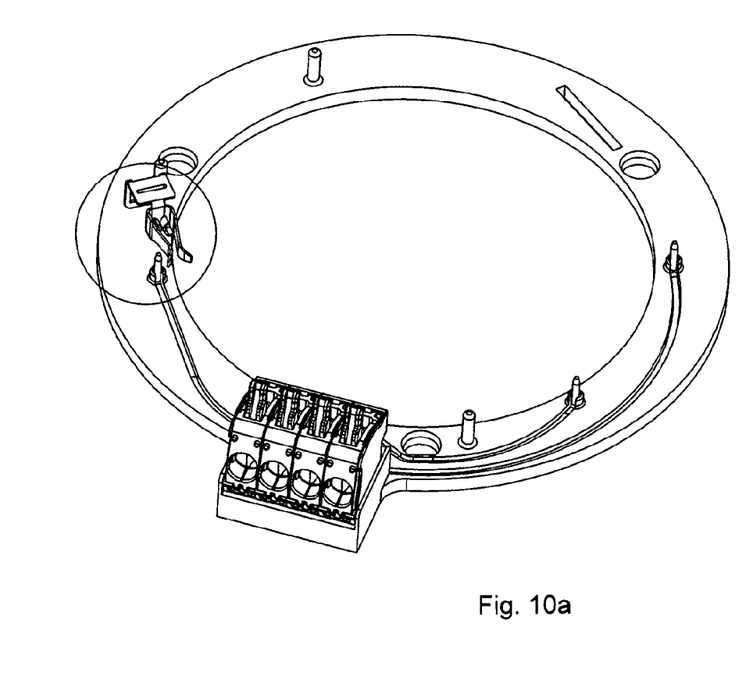
FIG. 10a shows a perspective view of the second adapter element according to the invention with an individual contact of the lampholder housing.
Figure 10B:
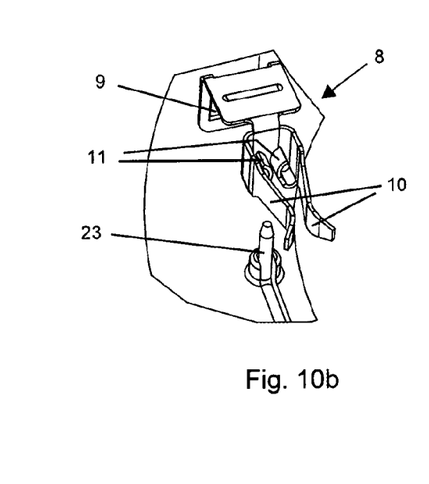

As a result, provision can also be made for wire inserts 22 in the form of electrical connections 19 to be used. This variant is illustrated in FIG. 9 to FIG. 10b.

The wire inserts 22 can be wires made from copper, for example. This variant saves on costs in comparison with the stamped parts. The method for bending the wires in order that they can be positioned in the guide tracks 24 is simple and in widespread use.

One end of each wire insert 22 is bent in order to produce a pin 23, which can be contacted with the individual contact 8 in the lampholder housing 3.

The other end of each wire insert 22 is connected to the respective contact 26, for example it can be soldered.

Figure 8A:
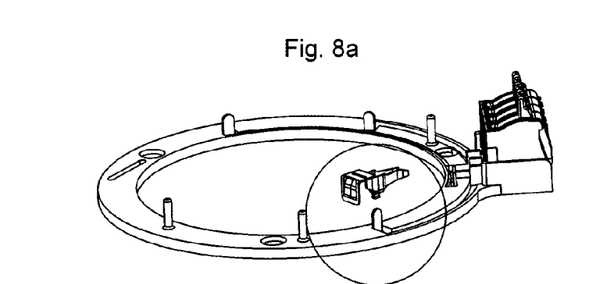
FIG. 8a shows a perspective view of the first adapter element according to the invention with an individual contact of the lampholder housing.
Figure 8B:
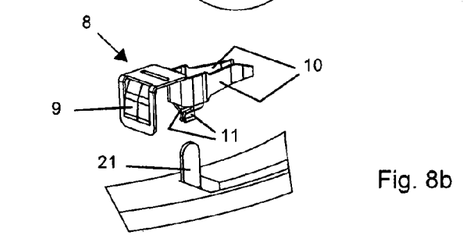

Depending on the type of electrical connection 19 used, the contact lugs 11 can be configured differently. In FIG. 8b, the contact lugs 11 are directed downwards for the lug 21 of the stamped part 20. In FIG. 10b, the contact lugs 11 are directed upwards for the pin 23 of the wire insert 22.

Figure 11A:
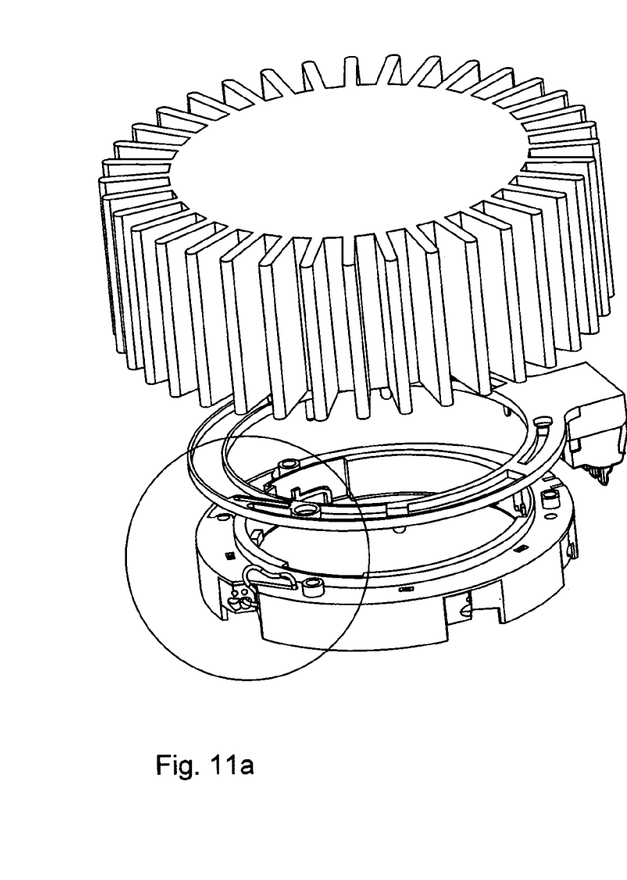
FIG. 11a shows an exploded view of a device according to the invention with an LED module and a heat sink, and with grounding.
Figure 11B:
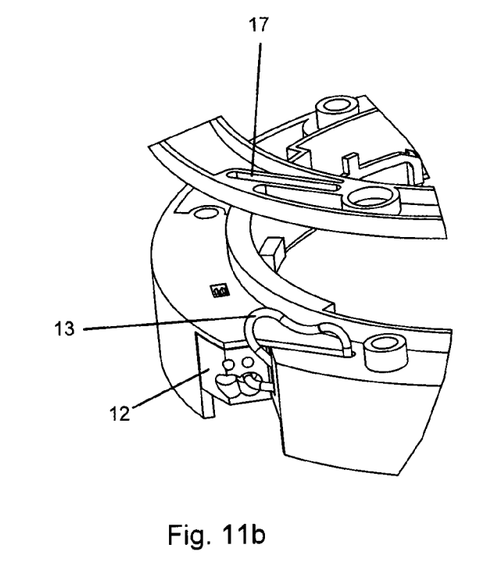

Grounding 13 can be provided, wherein the grounding 13 can be in the form of a wire bow. This can be seen in FIGS. 11a and 11b. The grounding 13 can be contacted directly by the LED module 2 on the heat sink without the adapter element 4 needing to be contacted. As a result, a slit 17 can be provided in the adaptor element 4 in order that the grounding 13 can be contacted directly by the electrical contact in the lampholder housing 3 to the heat sink 5. It is also advantageous for the grounding 13 if a contact terminal 12 is provided on the lampholder housing 3.

The embodiments illustrated in the figures are merely examples of the invention. Further embodiments (not illustrated here) are not intended to be ruled out. For example, the possibility of the adaptor element having a plurality of group contact points should not be ruled out.

DESIGNATIONS IN THE DRAWINGS

1. Device
2. LED module
3. Lampholder housing
4. Adaptor element
5. Heat sink
6. Contacting element
7. Slot
8. Individual contact
9. Resilient lug
10. Contact lug
11. Contact lug
12. Contact terminal
13. Grounding
14. Fastening hole
15. Positioning hole
16. Fastening hole
17. Slit
18. Positioning pin
19. Electrical connection
20. Stamped part
21. Lug
22. Wire insert
23. Pin
24. Guide track
25. Group contact point
26. Contact
27. Electrical terminal
28. Cutout

What is claimed is:

1. A device for fastening and contacting at least one of a lighting means or a lighting module, wherein the device (1) comprises at least one lampholder housing (3), wherein the lighting means or the lighting module, is arranged in the lampholder housing (3) of the device (1), wherein the at least one of a lighting means or lighting module, comprises at least two contacting elements (6), which are arranged separately from one another on the lighting means or lighting module, and which are each electrically contacted with an individual contact (8) of the lampholder housing (3), the device (1) comprises an adapter element (4) with at least one group contact point (25), wherein at least one electrical connection (19) is provided, wherein an individual contact (8) of the lampholder housing (3) and a contact (26) of a group contact point (25) are connected to an electrical connection (19).

2. The device as claimed in claim 1, wherein a first proportion of the individual contacts (8) of the lampholder housing (3) are passed via first electrical connections (19) to a first group contact point (25) of the adapter element (4), and a further proportion of the individual contacts (8) of the lampholder housing (3) are passed via further electrical connections (19) to a further group contact point of the adapter element (4).

3. The device as claimed in claim 1 the respective electrical connections (19) are arranged in the adapter element (4).

4. The device as claimed in claim 1, wherein the electrical connections (19) are in the form of stamped parts (20) or in the form of wire inserts (22) or in the form of conductor track circuit boards.

5. The device as claimed in claim 1, wherein a further conductor connection is made indirectly or directly from at least one group contact point (25) of the adapter element (4).

6. The device as claimed in claim 1, wherein an electrical terminal (27) is fitted at at least one group contact point (25) of the adapter element (4).

7. The device as claimed in claim 1, wherein the adapter element (4) is connected to the lampholder housing (3), wherein polarity reversal protection for mounting the adapter element (4) on the lampholder housing (3) is provided.

8. The device as claimed in claim 1, wherein the adapter element (4) is integrated in the lampholder housing (3).

9. The device as claimed in claim 1, wherein both contacting of the electrical connection (19) and additional contacting via the contact terminal (12) take place from an individual contact (8) of the lampholder housing (3).

10. A lamp having a device (1) as claimed in claim 1.

* * * * *